Aug. 4, 1942.   F. S. WHITE ET AL   2,292,184
VALVE
Filed Aug. 24, 1940   3 Sheets-Sheet 1

INVENTORS
Forrest S. White
Claude G. Bordeaux
by
ATTORNEY

Aug. 4, 1942.  F. S. WHITE ET AL  2,292,184
VALVE
Filed Aug. 24, 1940  3 Sheets-Sheet 2

INVENTORS
Forrest S. White
Claude G. Bordeaux
by Samuel L. Wood
ATTORNEY

Aug. 4, 1942.  F. S. WHITE ET AL  2,292,184
VALVE
Filed Aug. 24, 1940  3 Sheets-Sheet 3

Inventors
Forrest S. White.
Claude G. Bordeaux
By Dann L. Wood
Their Attorney.

Patented Aug. 4, 1942

2,292,184

UNITED STATES PATENT OFFICE 2,292,184

VALVE

Forrest S. White and Claude G. Bordeaux, Hoosick Falls, N. Y.

Application August 24, 1940, Serial No. 354,087

7 Claims. (Cl. 251—156)

While our invention is not necessarily limited thereto, it particularly relates to a globe valve in which the valve housing is usually provided with a transverse partition provided with an opening and a valve member cooperating with a seat surrounding the opening. In such a valve, the valve seat is, of course, enclosed in the valve housing and in order properly to form the valve seat or to grind the same, it is necessary to form or grind the seat inside of the valve housing where it is difficult of access. Furthermore, in order to cast the valve housing of conventional form, it is necessary to provide two cores.

Our present application is a continuation-in-part of our application Ser. No. 269,196 for Valve which was filed in the Patent Office April 21, 1939.

One of the objects of our invention is the provision of a valve of the foregoing type in which a readily removable insert is provided and which is provided with a valve seat and associated means for maintaining the insert in proper position in the valve housing and the valve seat in proper position with respect to the cooperating valve member.

Other objects of our invention will appear in the specification and the novel features thereof will be particularly pointed out in the claims.

Our invention will best be understood by reference to the accompanying drawings in which Fig. 1 is a section through a valve embodying our invention;

Like reference characters indicate like parts throughout the drawings.

Figure 1:
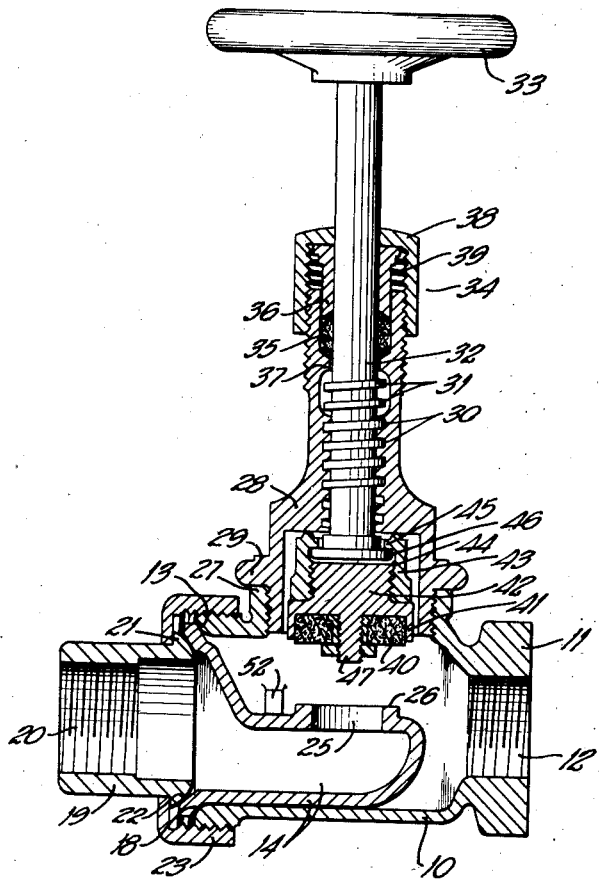
Figure 2:
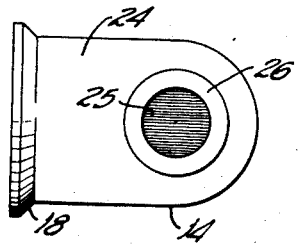
Fig. 2 is a plan view of the insert.

Referring to the drawings 10 is a valve housing preferably enlarged at one end 11 and provided with a threaded inlet opening 12 for the reception of a suitable pipe, the opposite end of the housing being provided with a machined end finished to present a rounded surface 13.

In accordance with our invention, a hollow insert 14 is provided which is closed at one end 15 which is preferably the end facing the inlet end of the valve housing when positioned therein. Ordinarily, the valve housing is circular in cross section on its interior and in such case the bottom 16 and the curved sides of the insert are machined and finished to a true circular surface the radius of curvature of which is substantially the same as that of the interior finished portion of the housing. The opposite end of the insert is provided with an outwardly extending flange 17 provided with a portion 18 which is ground or machined to a true surface which engages the rounded seat 13 at the end of the housing. The insert may conveniently be retained in position within the valve housing by means of a pipe connection 19 threaded on its interior as at 20 to engage the threads of a pipe and provided at its inner end with an outwardly extending flange 21 which is preferably rounded and machined as at 22 and engages the outer side of the flange 17, the outer surface of the flange 17 being machined to provide a finished surface which is engaged by the rounded flange 22. The pipe connection 19 may conveniently be retained in position against the flange 17 of the insert by a flanged union 23. The union 23 therefore when threaded home forces the rounded machined flange 21 of the pipe connection 19 against the outer seat on the outwardly extending flange 17 of the insert which in turn forms a tight seal between the seat 18 on the opposite side of the outwardly extending flange 17 and the finished end 13 at the end of the valve housing. The major portion of the upper side of the insert 41 is preferably provided with a finished surface 24 and is also provided with an opening 25 surrounded by a finished seat 26 which is integral with the insert.

The valve housing is also provided with a laterally extending flange or neck 27 which provides an opening for the valve operating stem, The head 28 for the operating stem is provided with an outwardly extending flange 29 which engages the neck or flange 27 of the housing, the latter providing a lateral opening for the operating stem. The head 28 is interiorly threaded as at 30 for the reception of the threads 31 on an operating stem 32 the outer end of which is provided with an operating handle 33 which may be of conventional form. Leakage is prevented by a gland indicated generally at 34 surrounding the valve operating stem and comprising fibrous material 35 which is compressed between a collar 36 surrounding the operating stem 32 and forming with an inwardly extending flange 37 a recess for the reception of the fibrous material. The collar may be compressed by a cap 38 the interior threaded portion 39 of which engages the outer threaded upper end of the head 28.

The valve member 40 is mounted within a flange 41 of the valve head 42 by means of a sleeve 43 threaded as at 44 and engaging the internal threads formed on the upper end of the valve head 42. The upper end of the sleeve 43 is provided with an inwardly extending flange 45 which engages a flange 46 within which the lower end of the valve stem 32 is provided. Valve members with valve heads of the foregoing general character have hitherto been suggested. In use, however, there has been the difficulty that the valve member becomes so firmly mounted in its seat that it is frequently impossible to remove the same without destroying the associated parts of the valve. In other words, it has been impossible to lift the valve member from its seat.

In accordance with our invention, means are provided for supplying a straight line force to the valve member which removes it bodily from its seat when it is desired to repair or replace the valve member. The valve head is provided with a downwardly extending threaded stem 47 on which is received an interiorly threaded sleeve 48 provided at its lower end with a nut 49 and its upper end with an outwardly extending flange 50 which is received in a recess 51 formed in the upper side of the valve member 40. The threaded sleeve 48 engages the threads on the stem 47. Now, when it is desired to repair or replace the valve member 40, it is only necessary to turn the sleeve 48 by means of the nut 49 and the valve member 40 is removed from its seat in a straight line.

Figure 3:
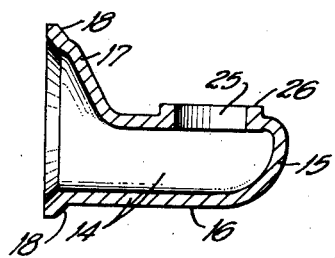
Fig. 3 is a longitudinal section through the insert.
Figure 4:
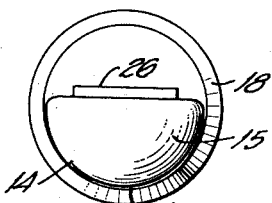
Fig. 4 is a front elevation of the insert.
Figure 5:
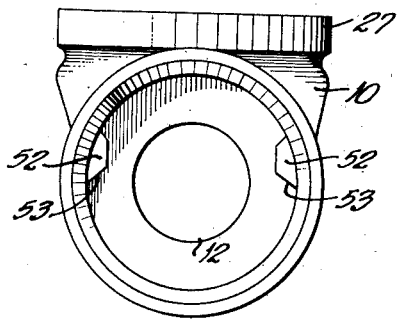
Fig. 5 is an end elevation of the valve housing illustrating the lugs within and at the sides of the valve housing for positioning the insert.
Figure 6:
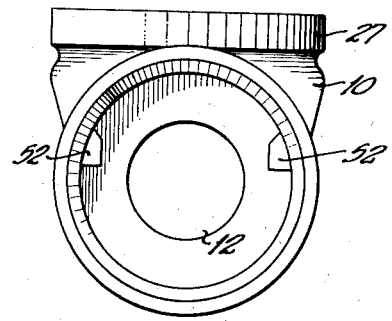
Fig. 6 is a view similar to Fig. 5 but illustrating the side lugs cut away to precise dimensions to position the insert accurately within the valve housing.
Figure 7:
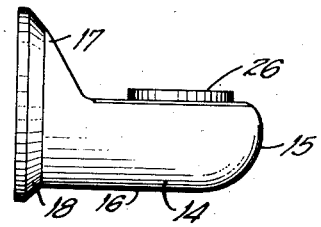
Fig. 7 is a side view of the insert.
Figure 8:
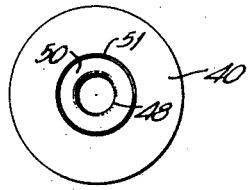
Fig. 8 is a plan view of the valve member.
Figure 9:
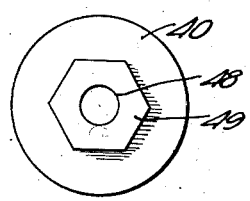
Fig. 9 is a bottom plan view of said valve member.
Figure 10:
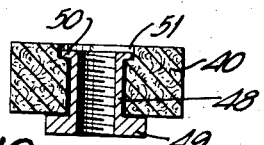
Fig. 10 is a vertical section through the valve member.

In accordance with our invention means are provided for accurately positioning the insert angularly within the valve housing. In the embodiment of our invention illustrated in Figs. 1 to 7 two lugs 52 are cast or otherwise formed on opposite sides of the interior of the valve housing preferably, the lugs are initially inclined on their lower sides at 53 as indicated in Fig. 3. The lower portions of the lugs are then removed by a suitable cutting tool mounted on a jig which cuts or machines the lugs to the form shown in Fig. 6 and with the lower edges of the lugs accurately positioned a predetermined distance above the bottom of the interior of the valve housing and therefore a predetermined distance above the upper side of the insert. Then when the insert is placed in the position indicated in Fig. 1, the upper surface of the insert and the upper surface of the valve seat are in planes parallel to the bottom of the valve member so that when the valve member is depressed by the valve operating stem the surface of the valve member accurately engages the valve seat. The center of the opening in the insert may readily be made to coincide with the axis of the valve operating stem by placing the insert on a suitable jig and bringing the outer surface of the flange 17 against a suitable tool, then by rotating the jig, the surface 18 of the outwardly extending flange 17 may be brought to a predetermined distance from the center of the valve opening. When the insert 14 is placed in position in the valve housing the valve seat 26 moves between the lugs 52 to the position shown in Fig. 1 and the bottom surfaces of the lugs 52 engage the top surfaces of the insert thereby preventing relative angular movement between the valve insert and the housing.

In Figs. 11, 12, 13 and 14 we have illustrated a modified form of positioning means for the insert cooperating with positioning means on the valve housing for preventing relative angular movement between the two. In the foregoing figures we have applied the same reference characters to parts that are the same as in previous figures and to parts that are modifications of corresponding parts we have applied the same reference characters with the letter *a* appended.

Figure 11:
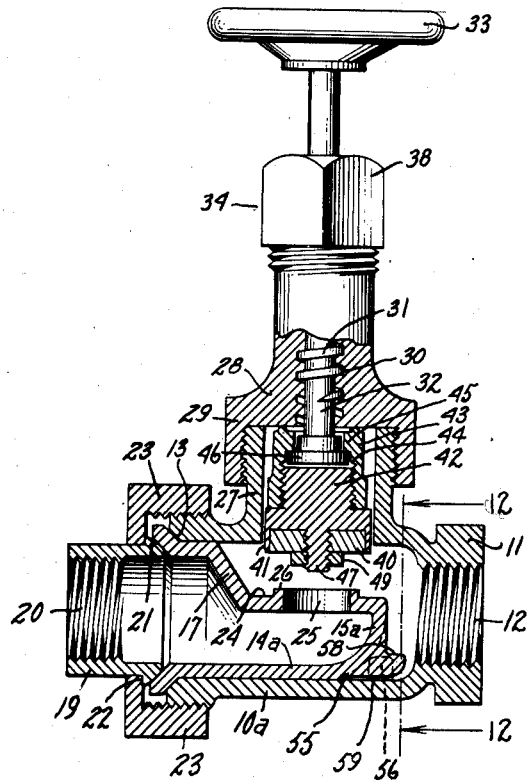
Fig. 11 is a sectional view through a valve embodying a modified form of our invention.
Figure 12:
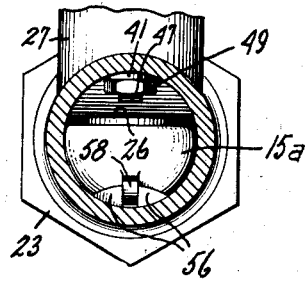
Fig. 12 is a sectional elevation taken along the line 12—12 of Fig. 11.
Figure 13:
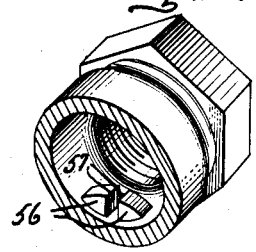
Fig. 13 is a sectional view illustrating spaced positioning lugs on the interior of the valve housing.
Figure 14:
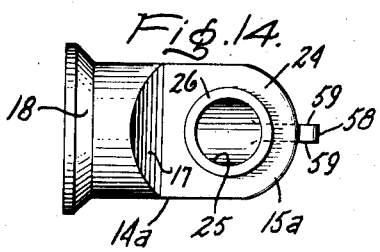
Fig. 14 is a plan view of the insert illustrated in Fig. 11.

In the embodiment of our invention here illustrated, a portion only of the valve housing is machined on its inner portion to a finished surface from the open end which receives the insert as viewed in Fig. 11 to point 55, the remaining bottom portion of the interior of the valve housing being unfinished. Two spaced inwardly extending lugs 56 are mounted on the unfinished portion of the housing. The inner surfaces of the lugs 56 are finished to true parallel surfaces 57 at a predetermined distance apart. The valve insert is provided with a forwardly extending lug 58 which may be cast or otherwise formed on the insert and which is provided at its sides with machined and finished surfaces 59 which are substantially the same distance apart as the distance between the lugs 56 so that when the insert is slid forwardly into position within the valve housing, the lug 58 is received between the inner surface of the lugs 56 and the insert is very accurately positioned within the valve housing. It is obvious that the lug 58 on the insert and the two lugs 56 on the interior of the valve housing could be reversed. In other words, the two lugs 56 could be placed on the forward end of the insert while the single lug is placed on the interior of the valve housing. The described positioning means are particularly applicable for use with the sliding fit between the insert and the housing where the lug of the insert is slidable into position between the lugs on the interior of the housing.

Preferably the forward end of the insert is cut away slightly as at 59 in order that any imperfection on the surrounding unfinished portion of the valve housing will have no tendency to displace the position of the valve insert and thereby defeat the very object of applicants' invention.

It is evident that when it is desirable to regrind the valve seat or otherwise repair the valve it is only necessary to remove the insert when the valve seat will readily be accessible and may be rubbed against an abrasive surface or, if badly worn, may readily be replaced, a feature which is not possible with the ordinary form of globe valve.

While we have described our invention in its preferred embodiment, it is to be understood that the words which we have used are words of description rather than of limitation. Hence, changes within the purview of the appended claims may be made without departing from the true scope and spirit of our invention in its broader aspects.

What we claim is:

1. In a valve, a valve housing provided with inlet and discharge openings, said housing being internally machined to provide spaced positioning guide surfaces and a finished annular surface adjacent one end of the housing terminating in an angularly disposed seat at the discharge end, a hollow valve insert receivable in said valve housing, said insert being closed at one end and machined externally to provide finished spaced guide surfaces and an annular surface terminating in an angular peripheral seat for seating engagement with the machined surfaces on the housing, said insert being also machined internally to provide an annular seat at the open end of the insert, the upper side of said insert being provided with an opening defined by an annular flange formed as an integral part of the insert, means for retaining said insert in said housing, and machined lugs on said housing and insert adapted to slidably engage to position and maintain alignment of the insert in the housing.

2. In a valve, a valve housing provided with inlet and discharge openings, said housing being internally machined to provide spaced positioning machined guide surfaces, and a finished annular surface terminating in an angularly disposed seat at the discharge end of said housing, a hollow valve insert receivable in said housing, said insert being closed at one end and machined externally to provide finished spaced guide surfaces slidably engaging said guide surfaces of said housing and provided at the open end thereof with an outwardly extending flange one side of which is machined to provide a finished surface engageable with said finished annular surface on said housing, a pipe connection provided with an outwardly extending flange rounded at its inner end and engageable with said outwardly extending flange on said insert, means for forcing said pipe connection against said outer extending flange of said pipe and the latter in turn against said finished annular surface on said housing, said insert having a laterally opening and surrounding flange adjacent its closed end forming a valve seat and a valve body for cooperating seating engagement on said flange.

3. In a valve, a valve housing provided with inlet and discharge openings and machined internally to provide a finished surface and provided with an inwardly extending positioning element having two parallel machined surfaces, an insert receivable in said housing and provided with an external positioning member having two spaced surfaces accurately machined and finished to slidably engage said surfaces of said element and prevent relative angular movement between the two, said insert being machined externally to provide a surface having a radius of curvature substantially the same as that of the machined inner surface of said housing, said housing being provided at one end with a machined finished seat, said insert being closed at one end and the opposite end thereof being provided with a machined seat engageable with said seat in said housing, the upper side of said insert being provided with an opening surrounded by a seat integral with said insert, and means for retaining said insert in the housing.

4. In a valve, a valve housing having a machined inner first portion and a second portion not machined the diameter of which is greater than that of said first portion, a first positioning element extending inwardly from said second portion and provided with two parallel machined surfaces, an insert receivable in one end of said housing and provided with a forwardly extending positioning element having two spaced accurately machined surfaces engageable with the parallel surfaces of said first positioning element whereby the parallel surfaces of said positioning element on said insert slidably engage the parallel surfaces of said positioning element of said housing, one end of said insert being closed, the discharge end of said housing being provided with a machined annular seat, and said insert being provided with a machined annular seat engageable with said seat on said housing, said insert being provided in its upper side with an opening surrounded by an integral raised annular flange defining a valve seat, said housing being provided with a lateral opening, externally threaded at the insert receiving end and means including a member threaded on said housing for retaining the insert in the housing.

5. In a valve, a valve housing provided with inlet and discharge openings, said housing being internally machined and finished for a portion of its length and leaving an unfinished portion of greater diameter for another portion of its length, said unfinished portion of said housing being provided with two inwardly extending machined lugs providing two spaced parallel surfaces extending longitudinally of said housing, an insert receivable in said housing and having an outer surface machined and finished to a radius substantially the same as that of said housing and provided with a forwardly extending member provided with two longitudinally extending machined surfaces substantially parallel to and engageable with said surfaces of said lugs thereby preventing relative rotation between said housing and said insert, the upper surface of said insert being provided with an opening surrounded by a raised seat integral with the main body of said insert, said insert being closed at one end, said housing being provided at one end with a finished annular seat and said insert being provided with a finished seat engageable with the said finished seat in said housing and forming a seal therewith, and means threadedly engaged with said housing for retaining said insert on its seat in the housing.

6. In a valve, a valve housing with inlet and discharge openings and internal spaced machined guiding surfaces, said housing also having a machined inner surface terminating in an annular seat at one end, an insert slidably receivable in said housing through one end thereof and having guide surfaces adapted to slidably engage the guiding surfaces on the housing to accurately position the insert in the housing, said insert being closed at one end and provided at its opposite end with a peripheral flange machined to define an annular seat engageable with said seat on the housing, the upper side of said insert being provided with a plane surface with an opening surrounded by a valve seat forming an integral part of the insert, means for retaining said insert on its seat in the housing, a plurality of spaced inwardly extending machined lugs on the housing adapted to slidably engage the upper plane surface of the insert.

7. In a valve of the character described, a housing having inlet and outlet openings at opposite ends thereof and a lateral intermediate opening for detachably mounting a valve and valve actuating means, said housing having accurately machined surfaces one end thereof defining an angular seat at the end of the housing and a related arcuate bearing surface extending inwardly of the housing, a plurality of spaced lugs projecting inwardly of the housing and having machined positioning guide surfaces, an insert receivable in the machined end of the housing having spaced machined guide surfaces adapted to slidably engage the arcuate bearing surface and the machined lug surfaces within the housing, said insert being an integral structure closed at one end and provided at its opposite end with a machined peripheral flange defining an angular seat engageable with the end seat on the housing, the upper side of said insert being provided inwardly of the housing with a plane surface and with a lateral opening surrounded by a raised annular valve seat flange forming an integral part of the insert, a coupling member frictionally engageable in the open end of the insert, and means for binding the coupling member, valve insert and housing together in seated engagement.

FORREST S. WHITE.
CLAUDE G. BORDEAUX.